United States Patent
Licht et al.

(10) Patent No.: US 10,796,330 B2
(45) Date of Patent: Oct. 6, 2020

(54) CHANNEL AND ENTITY INDEPENDENT REWARD PROCESSING

(71) Applicant: NCR Corporation, Duluth, GA (US)

(72) Inventors: Yehoshua Zvi Licht, Alpharetta, GA (US); Suzan Szollar, Menlo Park, CA (US)

(73) Assignee: NCR Corporation, Atlanta, GA (US)

( * ) Notice: Subject to any disclaimer, the term of this patent is extended or adjusted under 35 U.S.C. 154(b) by 810 days.

(21) Appl. No.: 15/472,315

(22) Filed: Mar. 29, 2017

(65) Prior Publication Data

US 2018/0204239 A1 Jul. 19, 2018

Related U.S. Application Data

(60) Provisional application No. 62/446,663, filed on Jan. 16, 2017.

(51) Int. Cl.
*G06Q 30/02* (2012.01)
*G06Q 20/36* (2012.01)
*G06Q 20/38* (2012.01)

(52) U.S. Cl.
CPC ....... *G06Q 30/0233* (2013.01); *G06Q 20/363* (2013.01); *G06Q 20/3678* (2013.01); *G06Q 20/38* (2013.01); *G06Q 2220/00* (2013.01)

(58) Field of Classification Search
CPC combination set(s) only.
See application file for complete search history.

(56) References Cited

U.S. PATENT DOCUMENTS

2017/0052676 A1* 2/2017 Pulier ................. G06F 3/04817
2017/0317833 A1* 11/2017 Smith ................ G06Q 20/3276

* cited by examiner

*Primary Examiner* — Alexandru Cirnu
(74) *Attorney, Agent, or Firm* — Schwegman, Lundberg & Woessner

(57) ABSTRACT

A virtual wallet of a consumer is established for receiving and transferring units of rewards over a plurality of disparate communication channels and a plurality of disparate entities. Units of rewards are processed to credit the virtual wallet from an issuing entity to the consumer and the units of rewards are processed to debit the virtual wallet of the consumer and credit a redeeming entity. Moreover, the units of rewards represent blockchaining reward value.

20 Claims, 4 Drawing Sheets

CHANNEL AND ENTITY INDEPENDENT REWARD PROCESSING

RELATED APPLICATIONS

This application claims priority to U.S. Provisional Application Ser. No. 62/446,663 entitled: "Virtually Everywhere Rewards Using Blockchain Method," filed on Jan. 16, 2017; the disclosure of which is incorporated by reference herein in its entirety.

BACKGROUND

Consumers enroll in a variety loyalty programs with merchants. These programs are not interoperable and each program includes its own proprietary reward conversion rules. As such, rewards have limited value to the consumer because restrictions exist for how, when, and where the rewards are redeemable. These restrictions are inconsistent across merchants, which further makes it difficult for merchants to partner and create greater value to their joint customers.

Consumers want the flexibility of shopping where and when they want with rewards that go with them. Today people are shopping online and on their mobile devices by interacting with ecommerce sites and merchant devices.

SUMMARY

In various embodiments, methods and a system for channel and entity independent rewards processing are presented.

According to an embodiment, a method for channel and entity independent rewards processing is provided. Specifically, and in an embodiment, a virtual wallet is created for a consumer to hold blockchaining rewards currency. The virtual wallet is credited with units of the blockchaining rewards currency and the virtual wallet is debited some of the units during a redemption transaction of the consumer.

DETAILED DESCRIPTION

Figure 1:
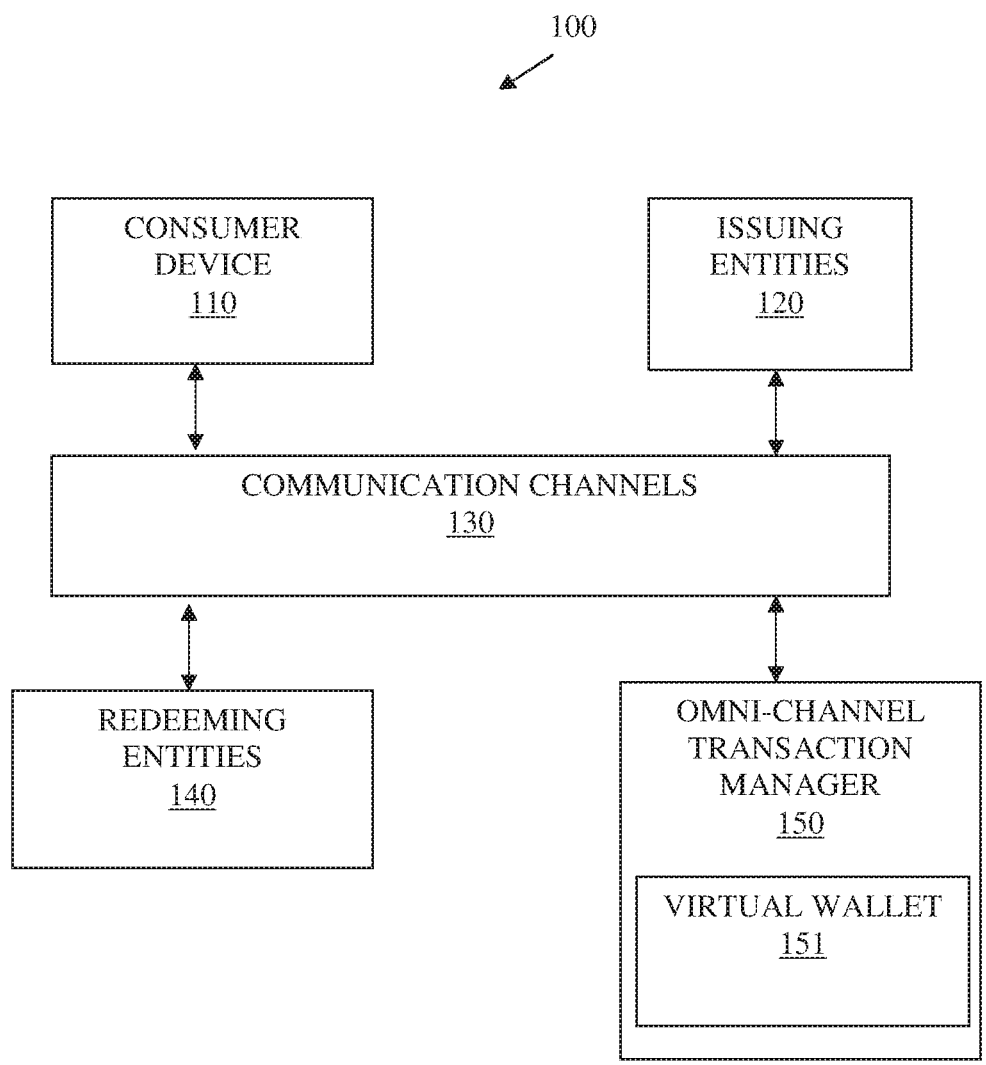
FIG. 1 is a diagram of a system for channel and entity independent rewards processing, according to an example embodiment.

FIG. 1 is a diagram of a system for channel and entity independent rewards processing, according to an example embodiment. The system 100 is shown schematically in greatly simplified form, with only those components relevant to understanding of one or more embodiments (represented herein) being illustrated. The various components are illustrated and the arrangement of the components is presented for purposes of illustration only. It is to be noted that other arrangements with more or less components are possible without departing from the channel and entity independent rewards processing techniques presented herein and below.

Moreover, various components are illustrated as one or more software modules, which reside in non-transitory storage and/or hardware memory as executable instructions that when executed by one or more hardware processors perform the processing discussed herein and below.

The techniques, methods, and systems presented herein and below for channel and entity independent rewards processing can be implemented in all, or some combination of the components shown in different hardware computing devices having one or more hardware processors.

The system 100 includes: a consumer-operated device 110, issuing entities 120, a plurality of communication channels 130, redeeming entities 140, and an Omni-channel transaction manager 150 that, inter alia, maintains a virtual wallet 151 for a consumer.

As used herein, the terms "consumer," "customer," and "user" may be used interchangeably and synonymously.

As used herein, the phrase "Virtual Reality (VR)" includes an augmented reality rendered as three-dimension real-world objects where participants (users) in a VR communication session experience space and time together within the augment reality through participant-controlled interaction with and manipulation of the objects within a VR room (one real-world depicted object rendered during the VR session where the space and time interaction occurs). The actual physical location of the participants during the VR session is irrelevant, such that the participants can (in the real-world during the VR session) be geographically dispersed from one another. The participants interact with one another and the objects rendered in the VR room during the VR session through VR-enabled input devices.

The virtual wallet of any participant is rendered as a wallet of the participants within the VR room and during the VR session. The contents of the virtual wallet can be displayed and manipulated by the owner of the virtual wallet within the VR room and during the VR session.

The consumer device 110 can include any processor-enabled device, such as but not limited to: a desktop computer, Virtual Reality (VR) enabled devices, a laptop computer, a wearable processing device, a tablet computer, a mobile phone, an in-vehicle processing device capable of network-based communication, a standalone appliance, or any device with network-capabilities that is part of the Internet-of-Things (IoTs).

The devices of the issuing entities 120 and redeeming entities 140 can include, by way of example only, a Self-Service Terminal (SST), a Point-Of-Sale (POS) terminal, an ATM, a kiosk, a tablet, a laptop, a wearable processing device, a device that is part of the IoTs, a server, a cloud-based device, a desktop computer, and the like.

The communication channels 130 includes a network-based communication channels, such as and by way of example only: phone-based communications, voice-based communications, VR-based (augmented reality with animation and audio) communications, messaging-based communications, text-based communications, video-based gesture communications, web (Internet) based communications, kiosk-based communications, Point-Of-Sale (POS) terminal based communications, and the like.

The Omni-channel transaction manager 150 manages delivery of rewards and redemption of the rewards through blockchaining processes. That is, the value of a reward is noted in an encrypted and portable format. Each unit of a particular reward has a unique identifier that is maintained and tracked. A private blockchaining approach is used so that the identity of the consumer possessing a unit of reward, the unique identifier of the issuing entity 120, the unique identifier of any redeeming entity 130, and the unique identifier for the unit of reward is maintained in one or more encrypted logs.

The issuing entity 120 pays value to obtain units of rewards, such as through a third-party or the Omni-channel transaction manager 150 and holds rewards in a virtual wallet associated with the issuing entity 120. In an embodiment, the paid value is a government backed currency value that has a conversion rate to a unit of reward. Similarly, the redeeming entity 140 has a virtual wallet in which rewards are transferred by the Omni-channel transaction manager 150.

Additionally, when the consumer uses device 110 to receive a first unit of reward, the Omni-channel transaction manager 150 provides the consumer with a virtual wallet 151 from which the consumer can receive rewards from issuing entities 120 (through the issuing entities virtual wallet) and from which the consumer can redeem rewards by transferring the rewards from the consumer's virtual wallet 151 to the virtual wallet of a redeeming entity 140.

Access to the virtual wallets can be done in a variety of manners with a variety of authentication. For example, the virtual wallet may be provided as a scan-accessible Quick Response (QR) code presented on a display of a device. The virtual wallet may also be provided as a long sequence of characters and/or digits. Each virtual wallet is maintained by the Omni-channel transaction manager 150. In some cases, the virtual wallets are maintained on devices of the consumer or the entities 120 and 140 and the Omni-channel transaction manager 150, such that the Omni-channel transaction manager 150 does not maintain the virtual wallets.

An example authentication mechanism for access to the virtual wallet 151 can include a Time-Based One-Time Password (TOTP) approach, where after the consumer provides a password for accessing the virtual wallet 151, the Omni-channel transaction manager 150 sends a randomly generated code as a text to a registered mobile phone. The consumer then enters the code with the Omni-channel transaction manager 150 and the Omni-channel transaction manager 150 authenticates the consumer for access to the virtual wallet 151. It is noted that other mechanisms for authentication and maintaining the virtual wallets can be done and the above was provided as one example for purposes of illustration.

During operation of the system 100, a consumer receives a unit of reward from an issuing entity 120. Assuming the consumer has a virtual wallet 151 with the Omni-channel transaction manager 150, the consumer authenticates for access to the virtual wallet 151 and displays the wallet as a QR code on the display of the consumer's phone (device 110). The issuing entity 120 scans the QR code and initiates a transfer of the unit of reward from the issuing entity's virtual wallet to the consumer's virtual wallet 151 through the Omni-channel transaction manager 150. The Omni-channel transaction manager 150 records a transfer for the uniquely identified unit of reward from the issuing entity's virtual wallet to the consumer's virtual wallet 151 and logs the transfer.

Subsequently, after the consumer has some unit of reward value in the consumer's virtual wallet 151 and when the consumer desires to redeem some of the rewards, the consumer scans or acquires the identifier of the redeeming entity's virtual wallet and transfers the needed rewards from the consumer's virtual wallet 151 to the redeeming entity's virtual wallet through an interface with the Omni-channel transaction manager 150. Again, the Omni-channel transaction manager 150 records a transfer for the uniquely identified amount of the reward from the consumer's virtual wallet 151 to the redeeming entity's virtual wallet and logs the transfer.

In an embodiment, the consumer receives and redeems the units of rewards inside a virtual reality (VR) session within one or more of the entities 120 and/or 140. The corresponding wallets are visible and accessible for issuing and redeeming rewards within the UR session by the parties (consume and entities 120 and 140). The Omni-channel transaction manager 150 is accessible for effecting the necessary transfers of the rewards from within the VR session.

For example, a consumer may be provided $100 worth of rewards for opening a credit card account with a bank. The consumer avails himself/herself to the offer. The bank (issuing entity 120) utilizes the Omni-channel transaction manager 150 to deposit $100 in value worth of rewards into the consumer's virtual wallet 151. Subsequently, the consumer is in a VR session reviewing televisions that the consumer wants for a big sports game corning up on television. While in the VR session, the consumer initiates a purchase transaction for a specific television set with a specific merchant (redeeming entity 140). The consumer receives the virtual wallet identifier for the merchant during checkout and utilizes the Omni-channel transaction manager 150 to transfer the $100 worth of rewards to the merchant's virtual wallet. The merchant reduces the price of the television set by $100 and the consumer completes the purchase within the UR session. The entire redemption portion of the channel and entity independent reward processing is performed within the VR session.

It is noted that the reward issuing processing can be done inside or outside of a VR session independent of whether the reward redemption processing is done inside or outside of the VR session. So both reward issuing and reward redemption processing can be done within a VR session, or just one of the reward issuing or reward redemption processing can be done within the VR session. Moreover, both the reward issuing and reward redemption can be done separately within different VR sessions.

In an embodiment, when a consumer has known units of rewards within the consumer's virtual wallet 151 and the consumer engages in a checkout within a VR session, the Omni-channel transaction manager 150 reminds the consumer of the value within the virtual wallet 151 and interactively asks whether the consumer wants to apply the value during the checkout process. In an embodiment, the Omni-channel transaction manager 150 determines whether to interactively ask the consumer to apply the value in the virtual wallet 151 based on the redeeming entity's identity and whether that redeeming entity is subscribed for the channel and entity independent reward processing.

In an embodiment, and assuming conditions established by the entities 120 and 140 do not prohibit, the consumer can receive or transfer some or all units of the rewards currency from the virtual wallet 151 to a different consumer's virtual wallet. So, consumer-to-consumer (C2C) reward currency transfers can occur.

The interaction between the consumer, the entities 120 and 140, and the Omni-channel transaction manager 150 can be achieved over a variety of communication channels 130 through Application Programming Interfaces (APIs) and interface modules (such as VR modules, websites, voice-activated and networked-enabled devices (Echo®, etc.), chat bots for texting or social media, mobile applications, and the like). Moreover, the issuing of a reward can occur over one type of channel 130 whereas the redemption occurs over a different type of channel 130.

The system 100 provides the processing and the platform for making rewards processing (issuing and redemption) channel-independent (Omni-channel accessible) and entity independent. So, rewards can be processed across a plurality of channels 130 and a plurality of different types of merchants. Essentially, rewards are portable, readily accessible, and readily redeemable.

These and other embodiments are now discussed with reference to the FIGS. 2-4.

Figure 2:
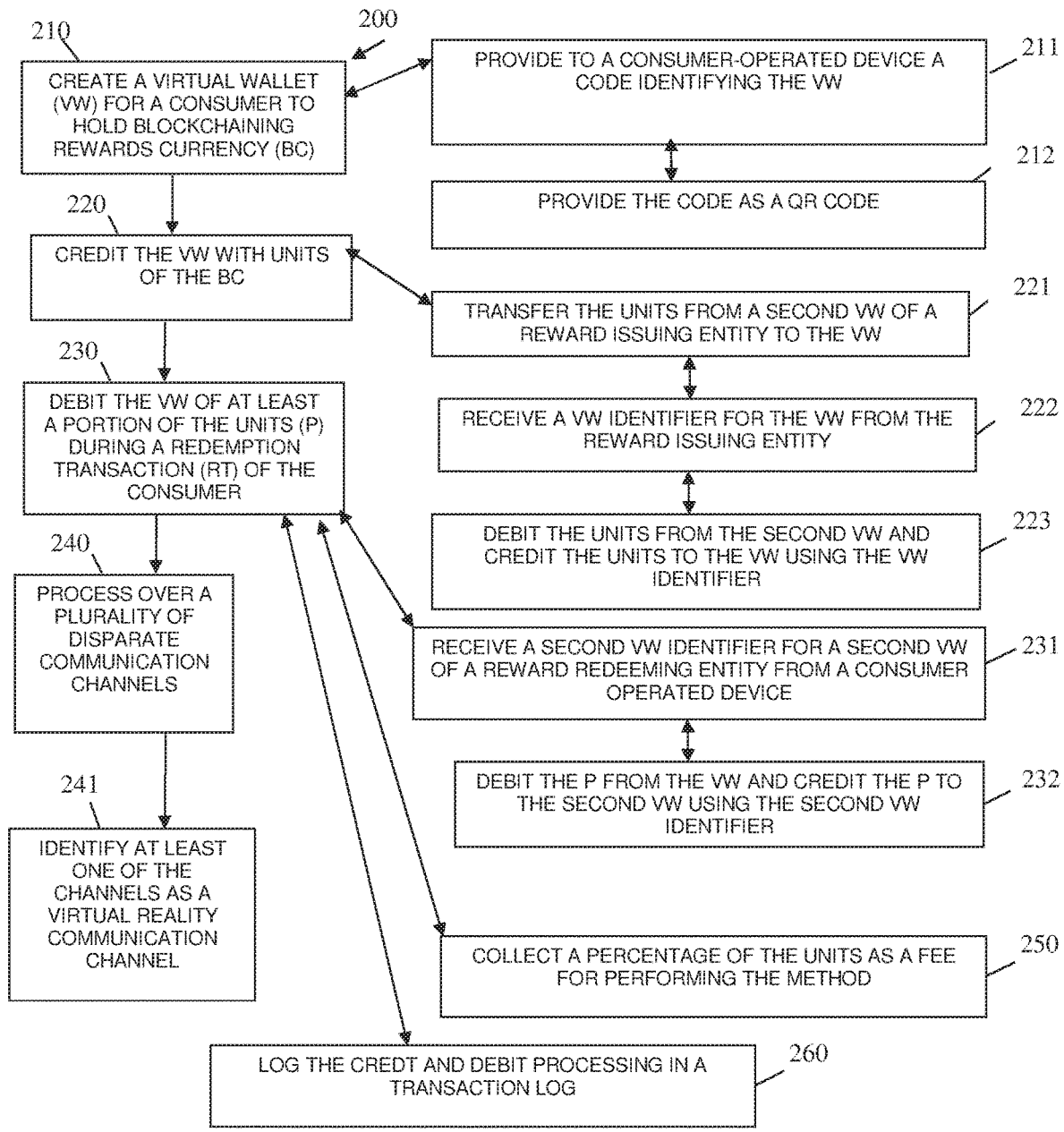
FIG. 2 is a diagram of a method for channel and entity independent rewards processing, according to an example embodiment.

FIG. 2 is a diagram of a method 200 for channel and entity independent rewards processing, according to an example embodiment. The software module(s) that implements the method 200 is referred to as a "rewards transaction manager." The rewards transaction manager is implemented as executable instructions programmed and residing within memory and/or a non-transitory computer-readable (processor-readable) storage medium and executed by one or more hardware processors of a hardware computing device. The processors of the device that executes the rewards transaction manager are specifically configured and programmed to process the rewards transaction manager. The rewards transaction manager has access to one or more networks during its processing. The networks can be wired, wireless, or a combination of wired and wireless.

In an embodiment, the device that executes the rewards transaction manager is a single device or set of devices that process in a cloud processing environment.

In an embodiment, the device that executes the rewards transaction manager is a server.

In an embodiment, the rewards transaction manager is the Omni-channel transaction manager 150.

At 210, the rewards transaction manager creates a virtual wallet to hold blockchaining rewards currency. In an embodiment, a value for a unit of the blockchaining rewards currency is converted based off a value of a unit of a government-backed currency. In an embodiment, a value of a unit of the blockchaining rewards currency is converted based off a value of a unit of a virtual crypto currency. In an embodiment, a value for a unit of the blockchaining rewards currency is an agreed corresponding value of a unit of a government-backed currency between participating parties issuing, using, and redeeming the blockchaining rewards currency.

According to an embodiment, at 211, the rewards transaction manager provides to a consumer operated device (such as device 110) a code that uniquely identifies the virtual wallet. This can be done in a variety of manners, such as those discussed above with the FIG. 1.

For example, at 212, the rewards transaction manager provides the code as a OR code that the consumer can present on a display of the consumer-operated device.

At 220, the rewards transaction manager credits the virtual wallet with units of the blockchaining rewards currency.

In an embodiment, at 221, the rewards transaction manager transfers the units from a second virtual wallet of a reward issuing entity (such as issuing entity 120) to the virtual wallet of the consumer.

In an embodiment of 221 and at 222, the rewards transaction manager receives a virtual wallet identifier from the virtual wallet of the consumer from a device associated with the reward issuing entity. For example, the consumer scans a OR code identifying the consumer's virtual wallet on a POS or SST of the reward issuing entity and using APIs the POS or SST submits a transaction request to the rewards transaction manager to transfer the units of the blockchaining rewards currency to the identified consumer's virtual wallet.

In an embodiment of 222 and at 223, the rewards transaction manager debits the units from the second virtual wallet of the reward issuing entity and credits the units to the virtual wallet of the consumer by using the virtual wallet identifier for the consumer's virtual wallet.

In an embodiment of 221-223, the reward issuing entity is a merchant providing the blockchaining reward currency.

In an embodiment of 221-223, the reward issuing entity is different consumer from the consumer that is transferring the units from the different consumer's virtual wallet to the virtual wallet of the consumer.

At 230, the rewards transaction manager debits the virtual wallet of at least a portion of the units during a redemption transaction of the consumer.

According to an embodiment, at 231, the rewards transaction manager receives a second virtual wallet identifier for a second virtual wallet of a reward redeeming entity (such as entity 140) from a consumer operated device (such as device 110).

In an embodiment of 231 and at 232, the rewards transaction manager debits the portion of the units being redeemed from the virtual wallet of the consumer and credits the portion of the units to the second virtual wallet using the second virtual wallet identifier.

In an embodiment, at 240, the rewards transaction manager processes over a plurality of disparate communication channels.

In an embodiment, the rewards transaction manager performs both the credit (220) and the debit (230) processing over a same communication channel.

In an embodiment of 240 and at 241, the rewards transaction manager identifies at least one of the disparate communication channels as a VR communication channel associated with a UR session that the consumer is engaged in.

In an embodiment, at 250, the rewards transaction manager collects a percentage of the units as a transaction fee for performing the processing on behalf of the consumer, issuing entities, and/or redeeming entities.

In an embodiment, at 260, the rewards transaction manager logs the credit (220) and the debit (230) processing in a transaction log. The transaction log can include a variety of details including, but not limited to, a unit identifier for each of the units, a unique identifier for the consumer, a unique identifier for any issuing entity, a unique identifier for any redeeming entity, a date, a time, and other information.

Figure 3:
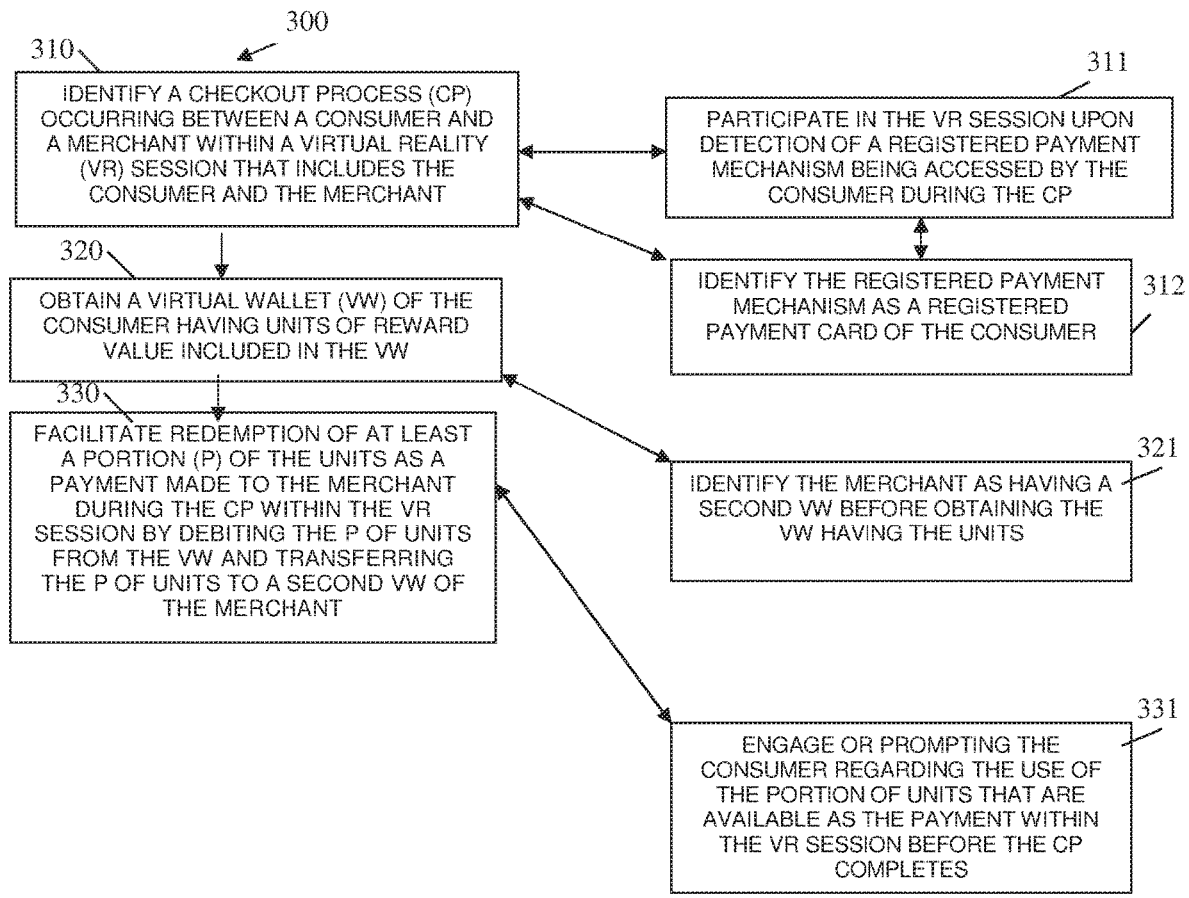
FIG. 3 is a diagram of another method for channel and entity independent rewards processing, according to an example embodiment.

FIG. 3 is a diagram of another method 300 for channel and entity independent rewards processing, according to an example embodiment. The software module(s) that implements the method 300 is referred to as a "virtual reality VR rewards manager." The VR rewards manager is implemented as executable instructions programmed and residing within memory and/or a non-transitory computer-readable (processor-readable) storage medium and executed by one or more hardware processors of a hardware device. The processors of the device that executes the VR rewards manager are specifically configured and programmed to process VR rewards manager. The VR rewards manager has access to one or more networks during its processing. The networks can be wired, wireless, or a combination of wired and wireless.

In an embodiment, the device that executes the VR rewards manager is a single device or set of devices that process in a cloud processing environment.

In an embodiment, the device that executes the VR rewards manager is a server.

In an embodiment, the VR rewards manager is the Omni-Channel transaction manager 150.

In an embodiment, the VR rewards manager is the method 200.

In an embodiment, the VR rewards manager is all or some combination of the Omni-channel transaction manager 150 and/or the method 200.

At 310, the VR rewards manager identifies a checkout process occurring between a consumer and a merchant within a VR session that includes the consumer and the merchant.

In an embodiment, at 311, the VR rewards manager participates in the VR session upon detection of a registered payment mechanism that was accessed by the consumer during the checkout process.

In an embodiment of 311 and at 312, the VR rewards manager identifies the registered payment mechanism as a registered payment card of the consumer. The payment card associated with a government backed currency payment mechanism and not associated with any blockchaining reward currency.

At 320, the VR rewards manager obtains a virtual wallet of the consumer having units of reward value included in the virtual wallet. The reward value is a unit of blockchaining reward currency.

According to an embodiment, at 321, the VR rewards manager identifies the merchant as having a second virtual wallet associated with the merchant before obtaining the virtual wallet of the consumer having the units. In other words, the VR rewards manager identifies that the merchant participates in payments using the reward value (blockchaining reward currency) based on having the virtual wallet associated with the merchant.

At 330, the VR rewards manager facilitates redemption of at least a portion of the units as a payment or a portion of a payment that is made to the merchant during the checkout process within the VR session. This is done by debiting the portion of units from the virtual wallet of the consumer and transferring the portion of units to a second virtual wallet of the merchant.

According to an embodiment, at 331, the VR rewards manager engages or prompts the consumer regarding the user of the portion of units that are available to the consumer as the payment within the VR session. This is done before the checkout process completes. In other words, when the consumer attempts to checkout during the checkout process, the VR rewards manager recognizes that the consumer as rewards value that can be applied as payment and reminds the consumer of the same during the checkout process.

Figure 4:
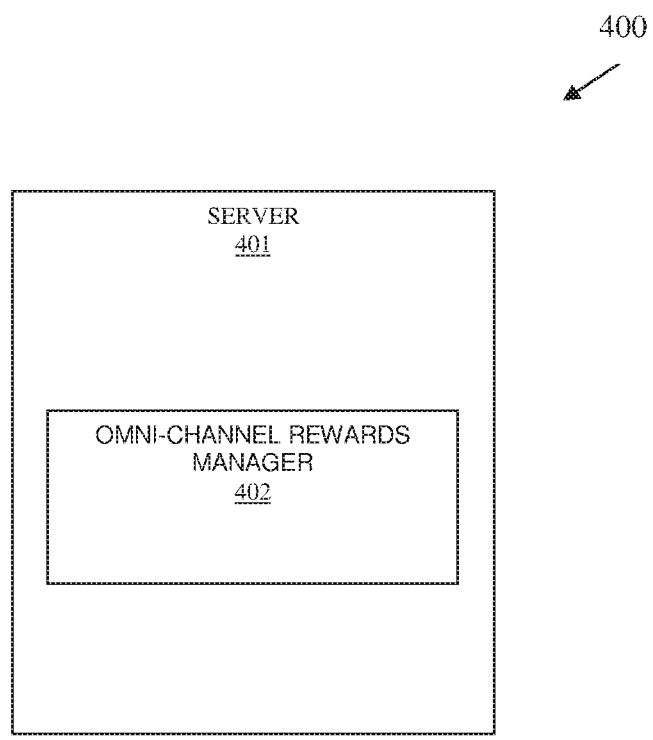
FIG. 4 is a diagram of another system for channel and entity independent rewards processing, according to an example embodiment.

FIG. 4 is a diagram of another system 400 for channel and entity independent rewards processing, according to an example embodiment. The system 400 includes a variety of hardware components and software components. The software components of the system 400 are programmed and reside within memory and/or a non-transitory computer-readable medium and execute on one or more hardware processors of a hardware device. The system 400 communicates one or more networks, which can be wired, wireless, or a combination of wired and wireless.

In an embodiment, the system 400 implements all or some combination of the processing discussed above with the FIGS. 1-3.

In an embodiment, the system 400 implements, inter alia, the processing described above with the system 100.

In an embodiment, the system 400 implements, inter alia, the method 200 of the FIG. 2.

In an embodiment, the system 400 implements, inter alia, the method 300 of the FIG. 3.

The system 400 includes a server 401 and the server including an Omni-channel rewards manager 402.

The Omni-channel rewards manager 402 is configured to: 1) execute on at least one hardware processor of the server 401; and 2) transfer blockchaining rewards currency between virtual wallets associated with a consumer, a reward issuing entity, and a reward redeeming entity.

In an embodiment, the Omni-channel rewards manager 402 is further configured to issue and redeem the blockchaining rewards currency within VR sessions.

In an embodiment, the Omni-channel rewards manager 402 is further configured, in 2), to: transfer some of the blockchaining rewards currency over a first communication channel and transfer other of the blockchaining rewards currency over a second communication channel. The first communication channel is a different type of communication channel from the second communication channel.

In an embodiment, the Omni-channel rewards manager 402 is the method 200, the method 300, the processing discussed in the FIG. 1, and/or some combination of these.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
creating, by executable instructions that execute on a processor of a server from a non-transitory computer-readable storage medium, a virtual wallet for a consumer to hold blockchaining rewards currency, wherein creating further includes rendering the virtual wallet for access by the consumer within a Virtual Reality (VR) room comprising real-world objects represented within the VR room for interaction by the consumer during a VR session utilizing a VR-enabled input device, wherein creating further includes permitting the consumer through the VR-enabled input device to manipulate contents of the virtual wallet during the VR session within the VR room;

crediting, by the executable instructions, the virtual wallet with units of the blockchaining rewards currency;

debiting, by the executable instructions, the virtual wallet of at least a portion of the units during a redemption transaction of the consumer;

managing, by the executable instructions, delivery of rewards and redemption of the rewards as the units of the blockchaining rewards currency through private blockchaining processes by encrypting values of the units, assigning each unit a particular unique identifier, maintaining each encrypted value for each unit, and tracking each encrypted value for each unit through the corresponding particular unique identifier utilizing the private blockchaining processes; and authenticating, by the executable instructions, the consumer for access to the virtual wallet within the VR room during the VR session by authenticating a password entered by the consumer, sending a Time-Based One-Time Password (TOTP) to a consumer operated device when the password is authenticated, and authenticating the TOTP entered by the consumer.

2. The method of claim 1, wherein creating further includes providing to the consumer operated device a code identifying the virtual wallet.

3. The method of claim 2, wherein providing further includes providing the code as a Quick Response (QR) code.

4. The method of claim 1, wherein crediting further includes transferring the units from a second virtual wallet of a reward issuing entity to the virtual wallet.

5. The method of claim 4, wherein transferring further includes receiving a virtual wallet identifier for the virtual wallet from the reward issuing entity.

6. The method of claim 5, wherein receiving further includes debiting the units from the second virtual wallet and crediting the units to the virtual wallet using the virtual wallet identifier.

7. The method of claim 1, wherein debiting further includes receiving a second virtual wallet identifier for a second virtual wallet of a reward redeeming entity from the consumer-operated device.

8. The method of claim 7, wherein receiving further includes debiting the at least a portion of the units from the virtual wallet and crediting the at least a portion of the units to the second virtual wallet using the second virtual wallet identifier.

9. The method of claim 1 further comprising, processing the method over a plurality of disparate communication channels.

10. The method of claim 9, wherein processing further includes identifying at least one of the plurality of disparate communication channels is a Virtual Reality communication channel associated with the VR session and the VR room.

11. The method of claim 1 further comprising, collecting, by the executable instructions, a percentage of the units as a fee for performing the method.

12. The method of claim 1 further comprising, logging, by the executable instructions, the crediting and debiting in a transaction log.

13. A method, comprising:

identifying, by executable instructions that execute on a processor of a server from a non-transitory computer-readable storage medium, a checkout process occurring between a consumer and a merchant within a Virtual Reality (VR) session that includes the consumer and the merchant, wherein identifying further includes monitoring a VR room comprising real-world objects represented within the VR room for interaction by the consumer and the merchant during a VR session utilizing VR-enabled input devices, wherein creating further includes permitting the consumer through at least one VR-enabled input device to manipulate contents of a virtual wallet associated with the consumer during the VR session within the VR room;

obtaining, by the executable instructions, the virtual wallet of the consumer having units of reward value included in the virtual wallet;

managing, by the executable instructions, delivery of rewards and redemption of the rewards as the units of the reward value through private blockchaining processes by encrypting the reward values of the units, assigning each unit a particular unique identifier, maintaining each encrypted reward value for each unit, and tracking each encrypted reward value for each unit through the corresponding particular unique identifier utilizing the private blockchaining processes;

authenticating, by the executable instructions, the consumer for accessing the virtual wallet within the VR room during the VR session by authenticating a password entered by the consumer, sending a Time-Based One-Time Password (TOTP) to a consumer-operated device when the password is authenticated, and authenticating the TOTP entered by the consumer; and facilitating, by the executable instructions, redemption of at least a portion of the units as a payment made to the merchant during the checkout process within the VR room during the VR session by debiting the at least a portion of units from the virtual wallet and transferring the at least a portion of units to a second virtual wallet of the merchant.

14. The method of claim 13, wherein identifying further includes participating in the VR session upon detection of a registered payment mechanism being accessed by the consumer during the checkout process within the VR room during the VR session.

15. The method of claim 14, wherein participating further includes identifying the registered payment mechanism as a registered payment card of the consumer.

16. The method of claim 13, wherein obtaining further includes identifying the merchant as having the second virtual wallet before obtaining the virtual wallet having the units.

17. The method of claim 13, wherein facilitating further includes engaging or prompting the consumer regarding use of the portion of units that are available as the payment within the VR session before the checkout process completes.

18. A system (SST), comprising:

a server comprising at least one processor and a non-transitory computer-readable medium;

the non-transitory computer-readable medium comprising executable instructions representing an Omni-channel rewards manager; and the Omni-channel rewards manager when executed by the at least one processor from the non-transitory computer-readable storage medium causes the at least one processor to perform processing comprising:

transferring blockchaining rewards currency between virtual wallets associated with a consumer, a reward issuing entity, and a reward redeeming entity during a Virtual Reality (VR) sessions within VR rooms;

rendering the virtual wallets for access by the consumer within VR rooms comprises real-world objects represented within the VR rooms for interaction by the consumer during a VR sessions utilizing at least one VR-enabled input device;

managing delivery of rewards and redemption of the rewards as units of the reward value through private blockchaining processes by encrypting the reward values of the units, assigning each unit a particular unique identifier, maintaining each encrypted reward value for each unit, and tracking each encrypted reward value for each unit through the corresponding particular unique identifier utilizing the private blockchaining processes;

permitting the consumer through the at least one VR-enabled input device to manipulate contents of the virtual wallets during the VR sessions within the VR rooms;

authenticating the consumer for accessing the virtual wallets within the VR room during the VR sessions by authenticating a password entered by the consumer, sending a Time-Based One-Time Password (TOTP) to a consumer-operated device when the password is authenticated, and authenticating the TOTP entered by the consumer.

19. The system of claim 18, wherein the Omni-channel rewards manager when executed by the at least one processor from the non-transitory computer-readable storage medium causes the at least one processor to perform additional processing comprising:

issuing and redeeming the blockchaining rewards currency within VR rooms of the VR sessions.

20. The system of claim 18, wherein the Omni-channel rewards manager when executed by the at least one processor from the non-transitory computer-readable storage medium causes the at least one processor to perform additional processing comprising:

transferring some of the blockchaining rewards currency over a first communication channel and transferring other of the blockchaining rewards currency over a second communication channel, wherein the first communication channel is a different type of communication channel from the second communication channel.

* * * * *